(No Model.) 7 Sheets—Sheet 1.

C. L. GOEHRING.
WOOD CARVING AND MOLDING MACHINE.

No. 394,766. Patented Dec. 18, 1888.

Witnesses:
J. F. Coleman.
A. J. Stewart.

Inventor.
Charles L. Goehring
by Church & Church,
his Att'ys.

(No Model.) 7 Sheets—Sheet 2.
C. L. GOEHRING.
WOOD CARVING AND MOLDING MACHINE.

No. 394,766. Patented Dec. 18, 1888.

Witnesses: Inventor
J. Coleman. by Charles L. Goehring
A. J. Stewart. Church & Church
His Atty's.

(No Model.)　　　　　　　　　　　　　　　　　7 Sheets—Sheet 3.
C. L. GOEHRING.
WOOD CARVING AND MOLDING MACHINE.
No. 394,766.　　　　　　　　　Patented Dec. 18, 1888.
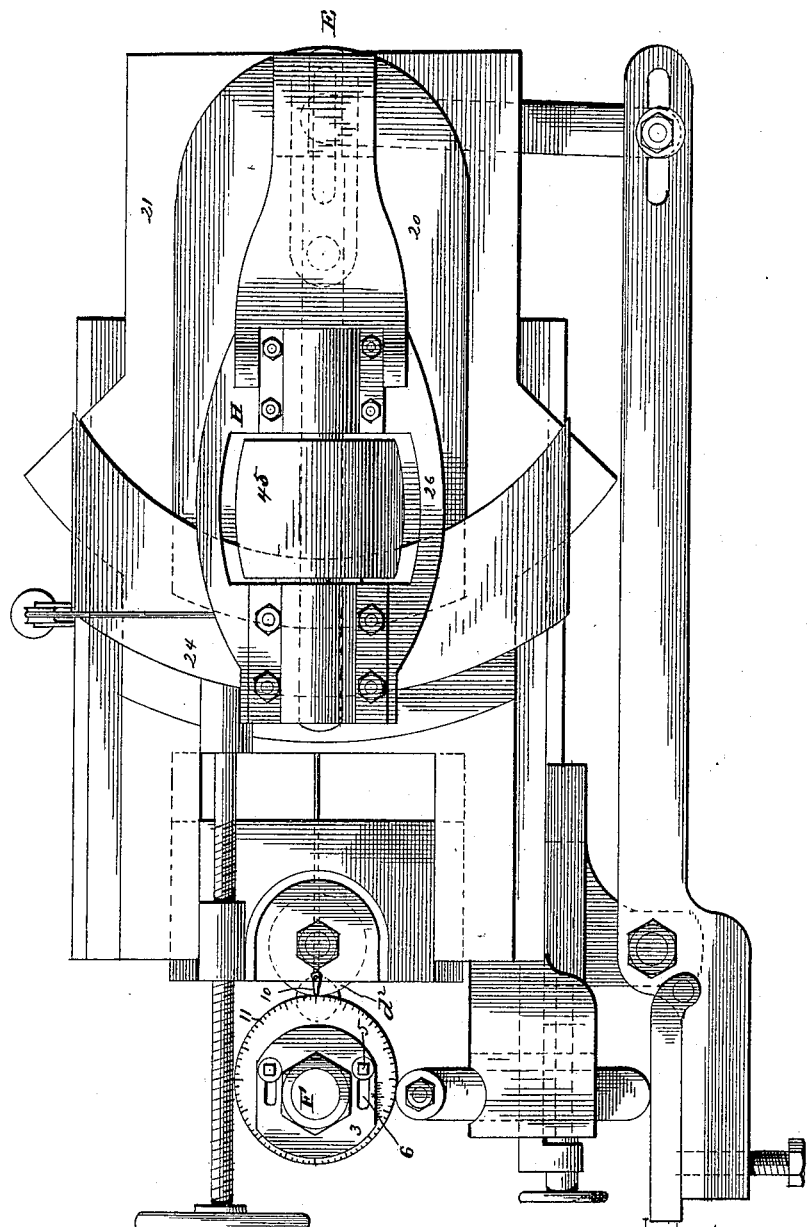

(No Model.) 7 Sheets—Sheet 4.
C. L. GOEHRING.
WOOD CARVING AND MOLDING MACHINE.
No. 394,766. Patented Dec. 18, 1888.
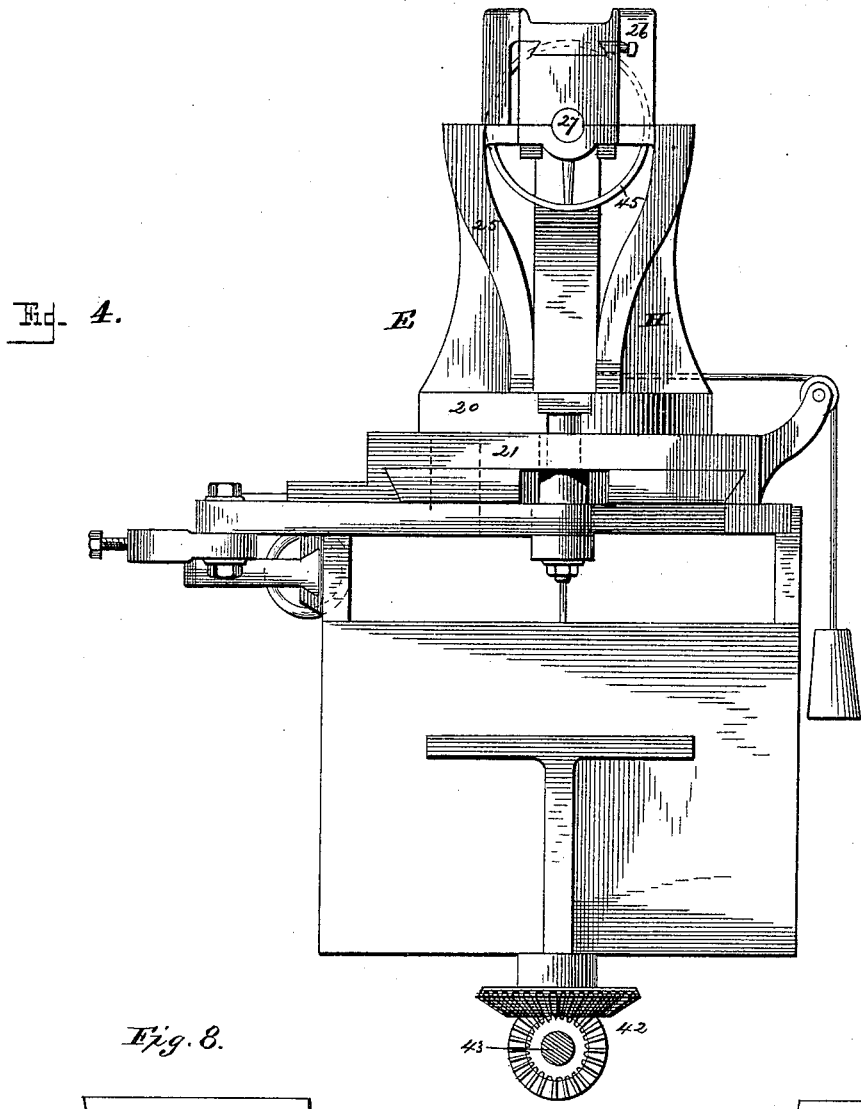

(No Model.) 7 Sheets—Sheet 5.
C. L. GOEHRING.
WOOD CARVING AND MOLDING MACHINE.
No. 394,766. Patented Dec. 18, 1888.
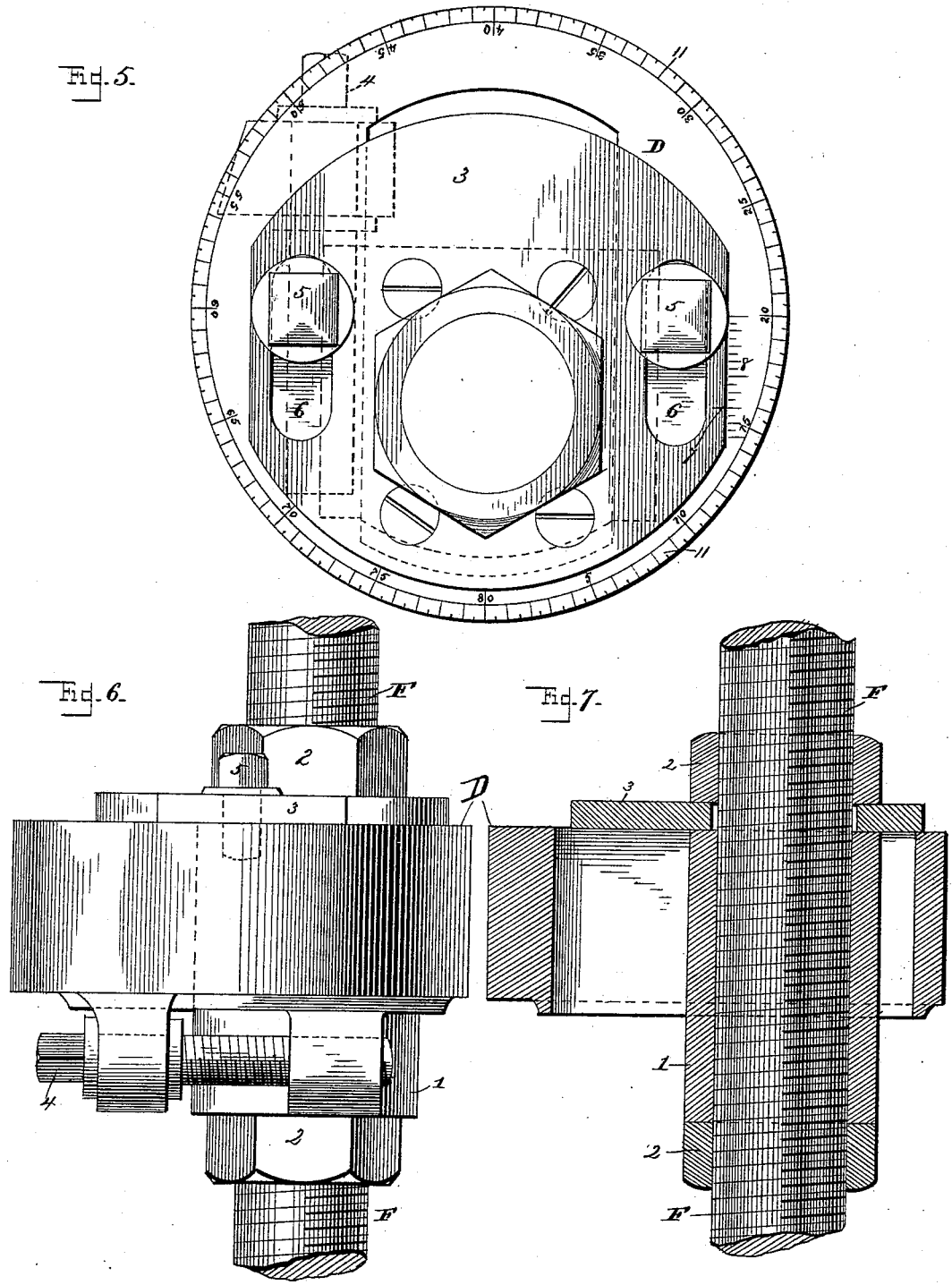

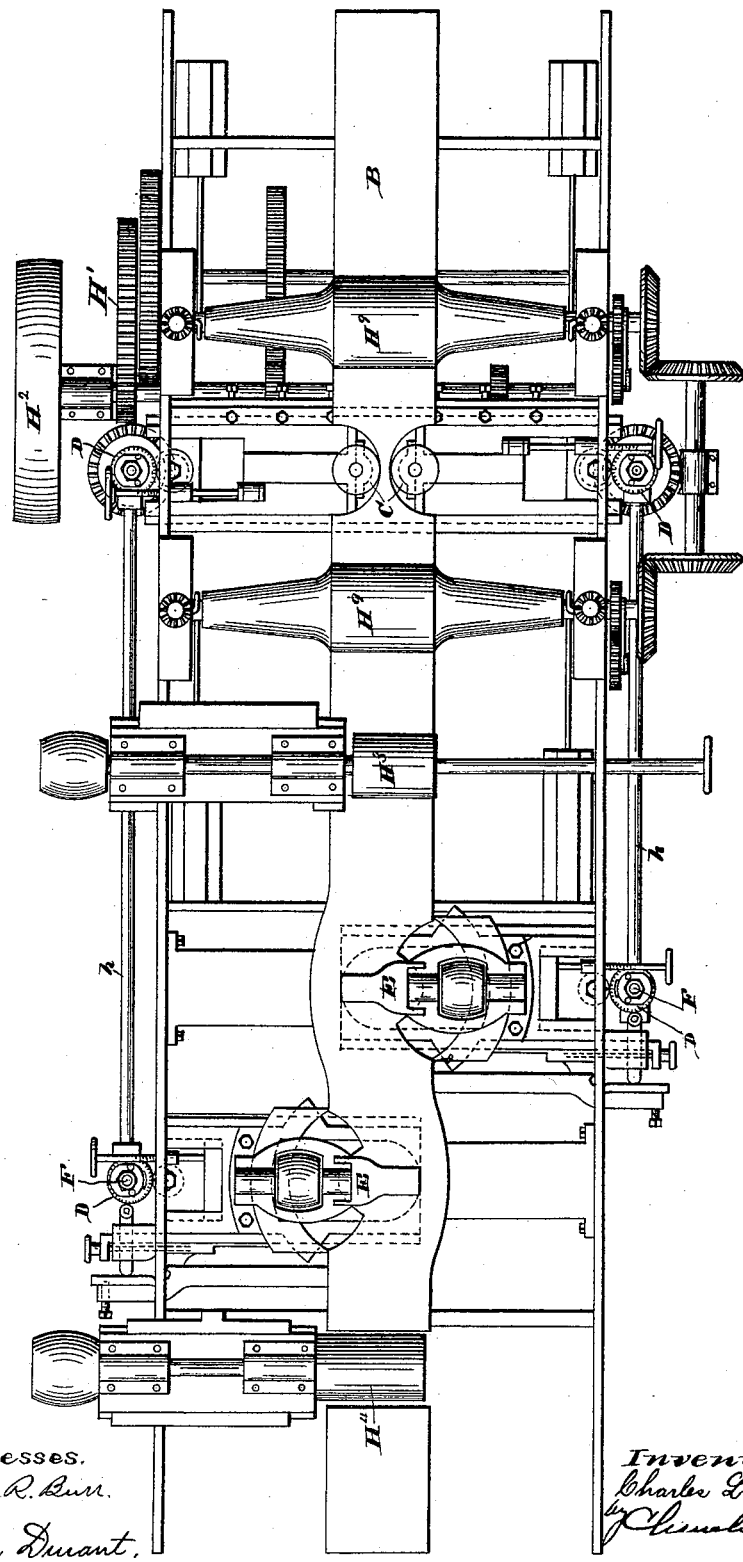

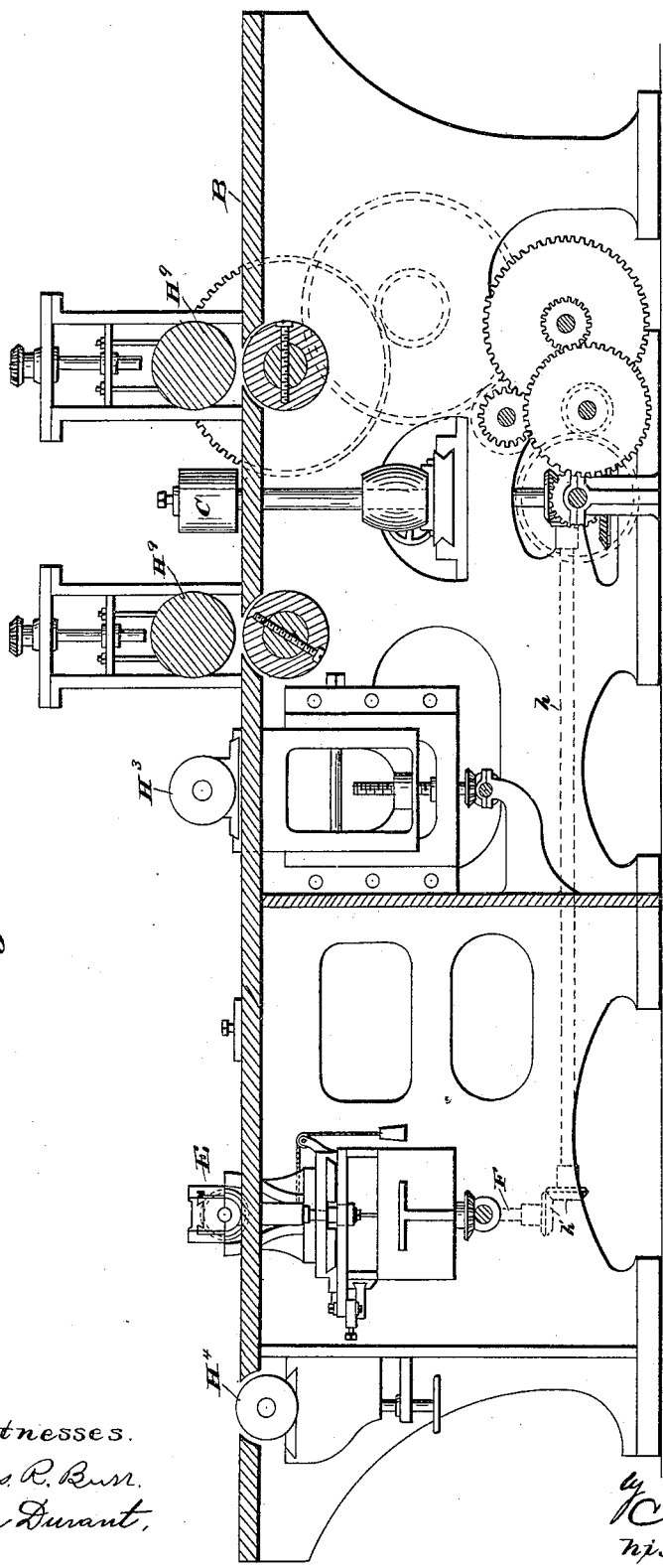

United States Patent Office.

CHARLES L. GOEHRING, OF ALLEGHENY, PENNSYSLVANIA.

WOOD CARVING AND MOLDING MACHINE.

SPECIFICATION forming part of Letters Patent No. 394,766, dated December 18, 1888.

Application filed March 17, 1888. Serial No. 267,530. (No model.)

*To all whom it may concern:*

Be it known that I, CHARLES L. GOEHRING, of Allegheny, in the county of Allegheny and State of Pennsylvania, have invented certain new and useful Improvements in Wood Carving and Molding Machines; and I do hereby declare the following to be a full, clear, and exact description of the same, reference being had to the accompanying drawings, forming a part of this specification, and to the figures and letters of reference marked thereon.

This invention relates to and constitutes an improvement upon the system and apparatus described in my application, Serial Nos. 260,097, 260,098, and 262,902; and it consists in the several novel constructions, combinations, and arrangements of parts, as hereinafter described, and pointed out in the claims.

Figure 1:
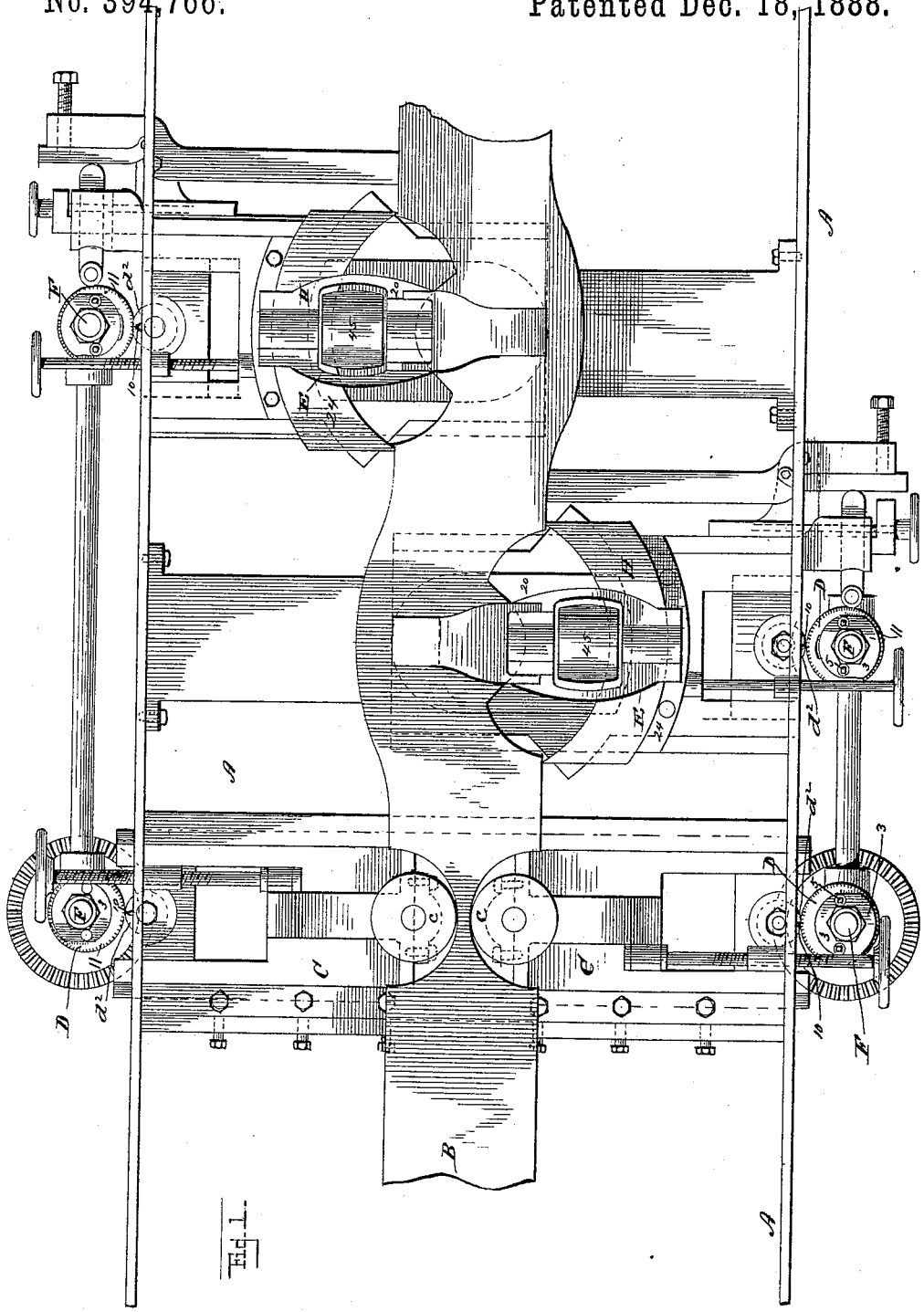
Figure 2:
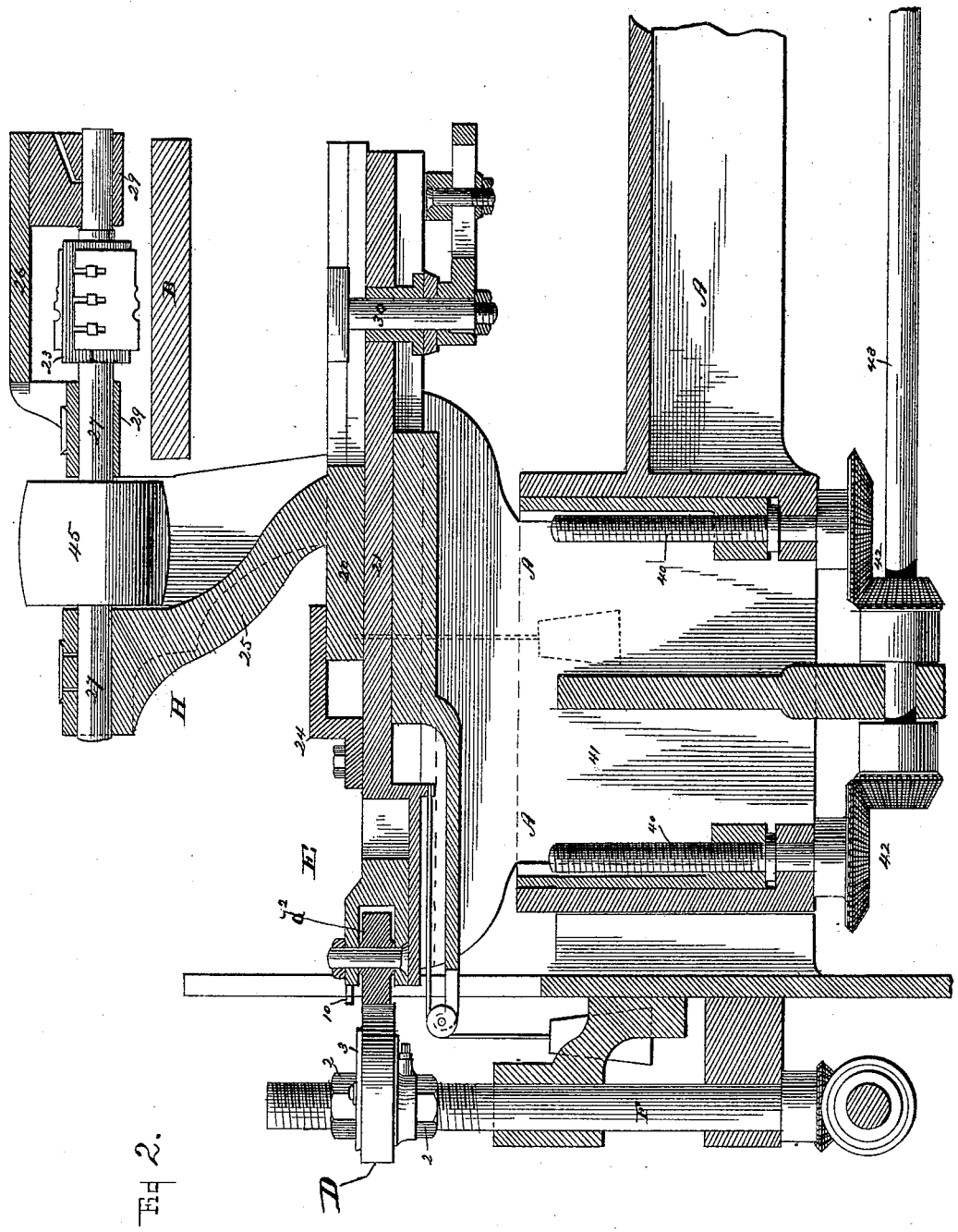

In the accompanying drawings, Figure 1 is a top plan view of a portion of a machine, illustrating the application thereto of my present improvements. Fig. 2 is a longitudinal vertical section through one of the cutting mechanisms. Fig. 3 is a top plan view, and Fig. 4 an end view, of the cutting mechanism. Figs. 5, 6, and 7 are top, side, and sectional views, respectively, of the adjustable actuating-cam. Fig. 8 is a plan view of a portion of the bed-plate. Fig. 9 is a top plan view; and Fig. 10, a longitudinal vertical section through an organized machine, showing the application of my present improvements.

Similar letters of reference in the several figures indicate the same parts.

The letter A designates the main frame, of any desired or approved construction, and B the bed-plate or work-supporting table, over or upon which the material is advanced or fed by suitable feeding devices connected to or operating in unison with the actuating devices for giving movement to the cutting mechanism, so that the advance of the material will always be proportional to the movements of the cutting mechanisms effected by the actuating devices, as fully described in my prior applications and illustrated in part in Figs. 9 and 10.

The feeding mechanism preferred, though other forms may be used, comprises one or more pairs of rollers, $H^9$, (two pairs are shown,) geared together and driven through a system of gearing, $H'$, from a pulley, $H^2$, or other prime mover.

C represents a pair of cutting mechanisms designed to operate upon the sides or edges of the material to shape the latter, and in so doing produce an undulating curved or irregular outline, for which purpose the spindles carrying the cutter-head $c$ are reciprocated transversely of the bed-plate or line of feed by suitable actuating devices, such as cams D.

E designates a cutting mechanism, (two only are shown, though any desired number may be employed,) which is designed to operate upon the face of the material to shape or ornament the latter, for which purpose it is provided with actuating devices competent to effect both lateral and radial movements of the cutter-head, so that the bits or cutters will be presented squarely to the advancing material as the cutter-head is caused to traverse across its face pursuant to the method described and claimed in another application, Serial No. 282,590.

The combination and arrangement of these several mechanisms are in the main substantially the same as described in my prior applications, hereinbefore referred to—that is to say, the actuating devices governing the movements of the cutting mechanisms C and E are connected to move in unison with each other and the feeding mechanism, so that the surface or ornamentation will follow and conform to the width of the material as determined by the cutting mechanism C and will conform to the general outline of the edges.

It is of the utmost importance, especially when forming strips or boards with curved or irregular edges provided with tongue and groove and an overlapping bead, that the two mechanisms C and E, the one operating on the edges and the other on the face, should be accurately adjusted relative to each other and the actuating devices, and that their movements should be synchronous; otherwise it would be impossible to form and finish the bead, as one cutter must of necessity follow substantially the same general direction as the other in order that the surface-cutting should coincide with the edge. The reason is obvious. Aside from the configuration of the cutters, which give form to the surface, the design or pattern produced is derived from and controlled by the relative motions of the cutter and the material, and when a composite or compound design is produced by the employment of two or more of the cutting mechanisms E, the design is further dependent upon the movements given the cutters belonging to said mechanisms relatively to each other as well as to the feeding mechanism. For example, let us assume the feeding mechanism is set to advance the material at a given speed. The cams controlling the actuating devices of the several cutting mechanisms are set, and the driving mechanism therefor is so proportioned and adjusted that the edge-cutters will be reciprocated once during the passage of a certain length of material—say, one complete reciprocation for six inches of feed motion. One complete figure or scallop, six inches in length, will thus be produced, and if the feeding mechanism and cam are driven in unison a series of uniform figures or scallops will be produced; but should the motion of either the feeding mechanism or actuating devices be interrupted or changed in any degree it will immediately effect a change in the form or proportions of the recurring figures and destroy the uniformity of the design. The same is true as to the action of the face-cutting mechanisms E. Where a single cutting mechanism, E, is employed, the figures or designs are regulated by the form of the bits and the motion of the cutters in a plane transverse to the feed motion—that is to say, the cutter is reciprocated back and forth across the face of the material as the latter moves beneath and at a regular speed. If the several mechanisms preserve their proper relations and relative motions, the design will be duplicated each time the cam or actuating mechanism performs one complete movement; but if any interruption occurs, either in the movement of the material or cutter, a variation in the figure will result.

In producing composite or compound figures or designs by the use of two or more mechanisms E the necessity for thus preserving the unitary action of the feed mechanism and the actuating devices of mechanisms E is rendered more apparent and essential, as in such case a slight change or departure in the relative motions of the cutting mechanisms E will not alone produce irregularities in the design and a variation in the proportions of the succeeding figures, but will change the whole character of the design and produce a different figure.

A careful consideration of the principles upon which my invention is founded will demonstrate that the patterns or figures resulting from the relative motions given the material and cutters can readily be calculated, and inasmuch as the direction of motion at the point where the cutter is applied to the surface of the material is dependent upon and deducible from the speed of the material and the speed and direction of motion of the cutter, it follows that by changing and adjusting the speeds of these two elements relatively to each other an infinite variety of figures or lines can be traced.

As the several cutting mechanisms E are each adapted to originate and impress upon the surface of the moving material a distinct figure, represented by the combined movements of the material and the cutter-head, unless the movements of all the mechanisms E coincide, not only in direction and extent, but in those particulars upon corresponding parts of the design, a figure or series of figures can be produced differing materially from those derived from the movement of any one of the mechanisms E. Thus if two cutting mechanisms E are employed, and their actuating devices are so arranged and adjusted that instead of following the same path on the surface of the material the path traversed by the second cutter shall approach and recede from, intersect, or coincide at intervals with the path traversed by the first cutter, a series of compound or composite designs can be formed, whose forms and dimensions can be regulated and determined by an adjustment of the actuating devices controlling the movements of the cutting mechanisms relatively to each other and to the movement of the material. In this way and by the use of properly-shaped bits a great variety of geometrical figures and designs can be produced, as more fully explained in my application, Serial No. 282,590.

One of the principal objects of my present invention is to provide for the adjustment of the actuating mechanisms controlling the movements of the cutters and for preserving the requisite uniformity of action, so that changes and variations in the designs produced can be readily and quickly effected. To this end the actuating devices or those parts which effect or control the transverse movements of the two systems of cutting devices—as, for example, the cams D—are made adjustable to vary the movement and are provided with gages or index-plates, so that the several cams can be quickly and accurately adjusted in a corresponding degree. An index or indicator is also provided for each actuating mechanism for setting the several devices or cams D at corresponding points, so that the movements of the cutting devices will be synchronized.

The preferred embodiment of these features is shown in detail in Figs. 5, 6, and 7, wherein F represents the driving-shaft of one of the actuating devices, screw-threaded to permit of vertical adjustment of the cam and connected by gearing with the actuating mechanism of the companion cutting mechanism. Upon the threaded portion of shaft F is fitted a sleeve, 1, held in adjusted position between jam-nuts 2. A plate, 3, is fastened to the sleeve 1, and the latter is formed or provided with guides or ways to receive the cam D and permit it to move thereon in a direction transverse to the sleeve 1 and shaft F, passing therethrough. A screw, 4, connecting the cam and sleeve, serves to effect the adjustment of the former upon and with respect to the latter, and bolts 5, passing through slots 6 in plate 3, may be employed for securing the cam in adjusted position.

The sleeve 1, or, what is the same thing, the plate 3, is provided with an index mark or pointer, 7, and the cam carries adjacent thereto a graduated scale, 8, (the position of scale and index may be reversed,) so that the degree of projection or eccentricity of the cam can readily be measured and adjusted. The divisions of the scales on the several cams in the series being the same or proportional, when all are adjusted to a corresponding point the movements imparted to the several mechanisms will be uniform.

The cam D makes contact with a roller or abutment, $d^2$, on the sliding frame of the cutting mechanism, and affixed to or carried by said frame is a pointer or marker, 10, co-operating with a series of graduated marks or division-points, 11, on the cam D. By means of the pointers 10 and scales 11 all the cams in the series are set or adjusted proportionally to each other, so that the traverse of the cutter-heads will coincide both in time and extent. Provision is thus made, first, for raising and lowering the cams D on their driving-shafts to accommodate the vertical adjustment of the several carriages; second, for adjusting the throw or eccentricity of the cams to vary the movements of the cutters transversely of the line of feed, and, third, for shifting the angular position of the series of cams and setting them at corresponding points.

Unitary action of the several actuating devices and the feed mechanism may be secured by driving the feed mechanism and shafts F from the same pulley, $H^2$, or other prime mover, the connection being made in the example illustrated in Figs. 9 and 10 through shafts $h$ and suitable gears, $h'$, so that each of the several mechanisms will preserve the same relative speeds as determined by the relative sizes of the gear-wheels.

Rotary heads $H^3$ $H^4$, for dressing the upper and under faces of the plank, may be employed when desired.

It is only when the lines traced by the face-cutters extend to or follow the general outline of the edge—as, for example, when forming an overlapping bead—that the actuating devices have necessarily to be set so as to move in unison and through equal distances, and it is more especially to provide for this kind of work that the two gages—the one for adjusting the throw of the cams and the other for determining their angular position—are employed and set with their zero-points at exactly corresponding positions on the several cams in order that the same adjustment may be given to all of the cams.

It is not alone as an aid in setting the machine that the graduated scales are employed in connection with the actuating devices, but to provide a means whereby any given design may be reproduced, and this is effected by making a record of the positions occupied by the several cams in producing a given pattern, so that when the latter is to be reproduced it is only necessary to refer to the record and set the several cams on the designated divisions of the scale.

By thus furnishing each cutting mechanism E with means whereby not only the throw of the cutter can be adjusted, but also with means whereby the relative motions of the several cutting mechanisms can be varied or set—i. e., by reversing or shifting the cams—in addition to the provisions made for substituting pattern-cams and changing the speed of the latter, the capacity of the machine to execute or produce a variety of designs is greatly enlarged, while the requisite uniformity of motion is preserved.

Another feature of improvement in my present machine relates to the construction and arrangement of the arbor-frame and its attachment to the reciprocating slide. In my prior machine the arbor-frame was situated below and pivotally attached to an overhanging portion of the slide above the table or work-support. The arbor and its frame were not readily accessible, and a relatively-small driving-pulley had to be employed, it being located beneath the slide and the belt passing through an opening in the latter.

In the present instance the arbor-frame H is mounted on the slide 21 and pivotally attached thereto at a point, 30, beneath, instead of, as heretofore, above the table B. The arbor-frame H is constructed with a base-plate, 20, resting upon slide 21 and held thereon by a guide or way, 24, and the pivot-pin 30. A standard, 25, affixed to or formed integral with the base-plate 20, projects vertically across the edge and rises above the table B, its upper portion being provided with a frame, 26, projected laterally across and above the table. The arbor 27, carrying pulley 45 and cutter-head 23, is mounted in boxes 29 in this transverse head 26 of the arbor-frame, there being one box at each end of the arbor and a third interposed between the pulley and cutter-head, while the outer box is made detachable to permit the removal of the cutter-head without withdrawing the arbor.

Any desired form or construction of mechanism for effecting the oscillation of the arbor-frame, as described in my prior application, may be employed, the special form shown by way of illustration merely being substantially identical with the mechanism for the same purpose described and claimed in my prior application, Serial No. 262,902.

The arbor-frame being supported in bearings above the slide, so that the belt does not have to pass through the frame, pulleys of any desired dimensions can be employed.

To accommodate the upright 25 in its oscillating movements, and at the same time preserve the bearing for the material beneath the cutter, the bed-plate B is cut away at the edge, as represented in Fig. 8.

Another improvement is effected by the employment of twin adjusting-screws 40, for moving the carriage 41, in which slide 21 reciprocates. The carriage is guided vertically in the frame; but its weight and the pressure and vibration produced when the cutter is operating upon the material passing beneath it are borne almost entirely by the adjusting-screws, which latter are arranged at opposite sides of the carriage and in line with the slide. The two adjusting-screws are connected to operate in unison by gears 42 and shaft 43, so that both ends of the carriage are shifted simultaneously and equally.

Any suitable arrangement of belts and pulleys may be employed for driving the arbors carrying the cutters—such, for example, as is shown in my application, Serial No. 260,097.

Having thus described my invention, what I claim as new is—

1. In a machine such as described, the combination, with the oscillating arbor-frame mounted upon a reciprocating slide, of the table for supporting the material to be operated upon, notched at the edge to accommodate the arbor-frame, substantially as described.

2. In a machine such as described, the combination, with the table or work-support and the transversely-reciprocating slide, of the arbor-frame carrying the cutter-head above the table and pivotally attached to the slide beneath the table, substantially as described.

3. In a machine such as described, the combination, with the table or support over which the material is fed, of the cutter-head supported in bearings in the arbor-frame above and transverse the table and the reciprocating slide extending beneath the table, said arbor-frame and slide being pivotally connected beneath the table and in line with the cutters or bits on the cutter-head, as and for the purpose set forth.

4. In a machine such as described, the combination, with the table or work-support, of the overhanging arbor-frame supporting the arbor-pulley and cutter-head in a plane above the table, said arbor-frame being pivotally attached beneath the table to a transversely-reciprocating slide and oscillating about a center intersecting the cutters, as and for the purpose set forth.

5. In a machine such as described, the combination, with the reciprocating slide carrying the oscillating arbor-frame and the vertically-movable carriage on which said slide is supported, of the adjusting-screws applied to the said carriage below and in line with the movement of the slide, substantially as and for the purpose set forth.

6. In a machine such as described, the combination, with the two reciprocating slides carrying oscillatory cutter-heads, the driving-shafts for transmitting motion to said slides, and driving-gearing connecting said shafts, whereby they are caused to move in unison, of a cam applied to each of said driving-shafts and interposed between the latter and the slide to control the reciprocatory movements of said slide, said cams being made adjustable as to throw and angular position with respect to the driving-shafts and slides, in order that the relative position and movements of the slides may be varied, and an index or indicator co-operating with the cams to determine the relative positions of adjustment and co-operative relations of the movable cutters, substantially as described.

7. In a mechanism such as described, wherein two or more independent oscillatory reciprocating cutting mechanisms are arranged in series to co-operate in forming a design or molding on the face of the material, the combination, with said cutting mechanisms arranged to traverse across the face of the material, and each provided with actuating devices—such as cams—for controlling the reciprocatory movements of the cutter across the face of the material, of a system of gearing adjustably connected to the said actuating devices and uniting the latter, substantially as described, whereby the actuating devices of one cutting mechanism can be shifted with respect to the driving-gearing to change the movements imparted to the several cutting mechanisms relatively to each other, as set forth.

8. In a mechanism such as described, the combination of two cutting mechanisms, one for dressing the edge of the material, being provided with a cutter-head mounted in a support movable toward and from the material, and the other for dressing the face, provided with a cutter-head mounted to oscillate and reciprocate across the face of the material, a feeding mechanism acting to advance the material, actuating devices—such as pattern-cams—operating upon the supports of each cutter-head to reciprocate the latter and control their movement, and a driving mechanism—such as a train of gearing—operating in unison with the feeding mechanism and adjustably connected to said actuating devices or cams, whereby the movements imparted to the cutting mechanism can be varied relatively to each other and the feeding mechanism, substantially as described.

9. In a mechanism such as described, the combination, with a series of reciprocating cutting mechanisms and a corresponding series of actuating devices—such as pattern-cams—controlling the reciprocatory movements of the cutter-supports, a driving mechanism common to the several actuating devices or cams and adjustably connected thereto, so as to permit one actuating device or cam to be advanced relatively to another, whereby the order in which the actuating devices operate to effect the reciprocatory movements of the cutters is varied or changed, and index-points connected to the actuating devices for setting the latter, as and for the purpose set forth.

10. In a mechanism such as described, the combination of a series of oscillatory reciprocating cutter-heads arranged to traverse the surface of the material, a corresponding series of actuating devices—such as cams—acting upon the supports for the cutter-heads to effect both the oscillatory and reciprocatory motions, and a driving mechanism—such as a system of gearing—adjustably connected to the series of actuating devices to permit one or more of said actuating devices to be advanced or the throw increased relatively to the others and the gearing, substantially as described, whereby the lines of travel by each cutter-head upon the face of the material can be varied relatively to the others and the design correspondingly modified, as set forth.

CHARLES L. GOEHRING.

Witnesses:
J. B. CHURCH,
FRED F. CHURCH.